US009847936B2

(12) United States Patent
Jani et al.

(10) Patent No.: US 9,847,936 B2
(45) Date of Patent: Dec. 19, 2017

(54) APPARATUS AND METHOD FOR HARDWARE-ACCELERATED PACKET PROCESSING

(71) Applicants: Nrupal Jani, Hillsboro, OR (US); Dinesh Kumar, Beaverton, OR (US); Christian Maciocco, Portland, OR (US); Ren Wang, Portland, OR (US); Neerav Parikh, Hillsboro, OR (US); John Fastabend, Hillsboro, OR (US); Iosif Gasparakis, Hilsboro, OR (US); David J. Harriman, Portland, OR (US); Patrick L. Connor, Beaverton, OR (US); Sanjeev Jain, Chandler, AZ (US)

(72) Inventors: Nrupal Jani, Hillsboro, OR (US); Dinesh Kumar, Beaverton, OR (US); Christian Maciocco, Portland, OR (US); Ren Wang, Portland, OR (US); Neerav Parikh, Hillsboro, OR (US); John Fastabend, Hillsboro, OR (US); Iosif Gasparakis, Hillsboro, OR (US); David J. Harriman, Portland, OR (US); Patrick L. Connor, Beaverton, OR (US); Sanjeev Jain, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 14/750,085

(22) Filed: Jun. 25, 2015

(65) Prior Publication Data
US 2016/0380885 A1 Dec. 29, 2016

(51) Int. Cl.
*H04L 12/721* (2013.01)
*H04L 12/26* (2006.01)
(Continued)

(52) U.S. Cl.
CPC .......... *H04L 45/44* (2013.01); *H04L 43/0876* (2013.01); *H04L 45/306* (2013.01); *H04L 47/125* (2013.01); *H04L 47/781* (2013.01)

(58) Field of Classification Search
CPC ........................... H04L 45/44; H04L 43/0876
See application file for complete search history.

(56) References Cited

U.S. PATENT DOCUMENTS

2007/0280223 A1  12/2007  Pan et al.
2007/0297437 A1  12/2007  Akella et al.
(Continued)

FOREIGN PATENT DOCUMENTS

WO  WO2013/044956 A1 *  4/2013
WO  WO-2014101849 A1  7/2014

OTHER PUBLICATIONS

"International Application Serial No. PCT/US2016/035518, International Search Report dated Sep. 5, 2016", 3 pgs.
(Continued)

*Primary Examiner* — Andrew Lai
*Assistant Examiner* — Sumitra Ganguly
(74) *Attorney, Agent, or Firm* — Schwegman Lundberg & Woessner, P.A.

(57) ABSTRACT

Devices and techniques for hardware accelerated packet processing are described herein. A device can communicate with one or more hardware switches. The device can detect characteristics of a plurality of packet streams. The device may distribute the plurality of packet streams between the one or more hardware switches and software data plane components based on the detected characteristics of the plurality of packet streams, such that at least one packet stream is designated to be processed by the one or more hardware switches. Other embodiments are also described.

22 Claims, 7 Drawing Sheets

(51) Int. Cl.
*H04L 12/725* (2013.01)
*H04L 12/803* (2013.01)
*H04L 12/911* (2013.01)

(56) References Cited

U.S. PATENT DOCUMENTS

| | | | | |
|---|---|---|---|---|
| 2009/0238178 A1* | 9/2009 | Giles | .................... | H04L 67/125 370/360 |
| 2010/0312718 A1* | 12/2010 | Rosenthal | .............. | G06Q 40/04 705/36 R |
| 2011/0243155 A1* | 10/2011 | Gondo | ................. | H04L 1/0045 370/474 |
| 2012/0147898 A1 | 6/2012 | Koponen et al. | | |
| 2013/0279504 A1 | 10/2013 | Gulati et al. | | |

OTHER PUBLICATIONS

"International Application Serial No. PCT/US2016/035518, Written Opinion dated Sep. 5, 2016", 5 pgs.

* cited by examiner

APPARATUS AND METHOD FOR HARDWARE-ACCELERATED PACKET PROCESSING

TECHNICAL FIELD

Embodiments described generally herein relate to processing of data packets sent or received through a network. Some embodiments relate to hardware acceleration of data packet processing.

BACKGROUND

Top-of-rack switches and special function hardware provide network functions including packet switching, security, deep packet inspection, and other functions. Recently, there has been a trend to provide virtual switches and network functions executing on high-volume computer architectures. Ongoing efforts are directed to improving coordination between switches to take advantage of speed benefits in hardware switches and flexibility and power of virtual switches.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Some data centers use top-of-rack (ToR) switches and special function hardware to provide network functions including packet switching, security, deep packet inspection, and other functions. However, customers may experience reduced functionality caused by hardware limitations such as limited memory, limited Ternary Content-Addressable Memory (TCAM), reduced total number of supported data flows, etc. Furthermore, hardware switches may be overly rigid with respect to packet parsing, and hardware switches can exhibit a general lack of platform flexibility and configurability.

Recently, there has been a trend within data centers to provide software-defined networking (SDN) for decoupling network functions from underlying hardware, which can help increase agility and lower costs. Similarly, network function virtualization (NFV) can replace fixed-function hardware with implementations fully in software that run more cost-effectively on general purpose, standards-based servers. However, such software-defined systems may not take advantage of some desirable characteristics of hardware switches.

Embodiments provide a way to coordinate and manage, in a fine-grained fashion, multiple data plane components to utilize desirable features of both hardware switching and SDN/NFV usages. Control plane components include mechanisms to determine where traffic (e.g., data packets or flows) should be directed, while data plane components include mechanisms that forward traffic to those destinations. Embodiments provide control plane methods and apparatuses to coordinate multiple data plane components. Data plane components can include, by way of nonlimiting example, Data Plane Development Kit (DPDK) components, field programmable gate array (FPGA) components, and Red Rock Canyon (RRC) switch components available from Intel of Santa Clara, Calif., among other components. Methods in accordance with various embodiments can coordinate utilization of these and other components in a dynamic and flexible fashion based on user-defined policies to reduce or minimize energy consumption or to enhance speed and performance. In embodiments, a control plane can offload a simple fast packet-processing pipeline from software-based switches or virtual switches to switch hardware, while providing for more-complicated processing on the CPU-based software data plane. Additionally, methods and apparatuses described below with respect to various embodiments can provide scaling actions responsive to changes in a monitored network load for additional power and performance enhancement.

Apparatuses, in accordance with various embodiments described later herein, include a control device including a switch interface to communicate with a hardware switch or a set of hardware switches. The control device can be referred to as an interplane control device in some embodiments or implementations. In some embodiments or implementations, the control device can be referred to as a control plane processor. The control device further includes a data plane interface to communicate with one or more data plane processors. The control device further includes processing circuitry to distribute packet streams between the hardware switch and software data plane components based on the detected characteristics of the packet streams, as will be described in more detail later herein. In contrast, some other hardware-accelerated packet processing architecture does not take advantage of both software and hardware data plane components.

Figure 1:
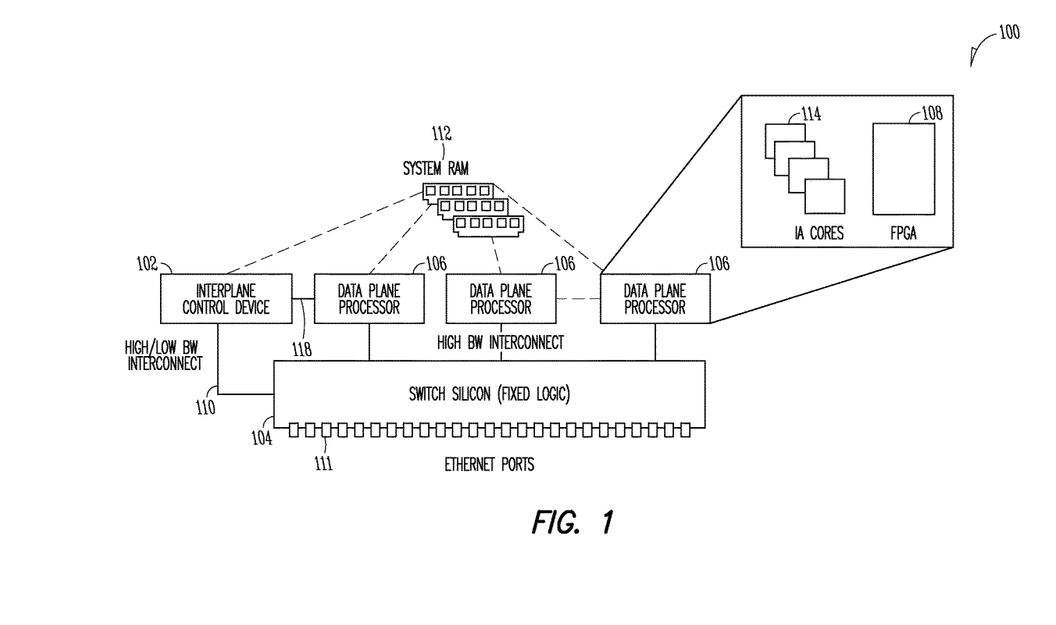
FIG. 1 illustrates components of a switching platform that includes a control device for implementing methods in accordance with some embodiments.

FIG. 1 illustrates components of a switching platform 100 that includes a control device 102 for implementing methods in accordance with various embodiments. The network operating system (in kernel or user space) runs on the switching platform 100 and, among other functionalities, manages a hardware switch 104, data plane processors 106, and associated accelerators programmed in the FPGA 108. The hardware switch 104 can include fixed-logic switch silicon (switch Si) circuitry or other hardware circuitry, and the hardware switch 104 can include a switch of the Intel® Ethernet Switch family, available from Intel Corporation of Santa Clara, Calif. Each of the data plane processors 106 are connected to the hardware switch 104 using very high-bandwidth, low-latency interconnects 110, which can support speeds of, for example, 10-40 Gigabit Ethernet (GbE). Additionally the data plane processors 106 are interconnected among each other to make a coherent fabric to access extended flow tables provided in random access memory (RAM) 112 of the switching platform 100, or to pass packets from one data plane processor 106 to the next, among other uses.

Figure 3:
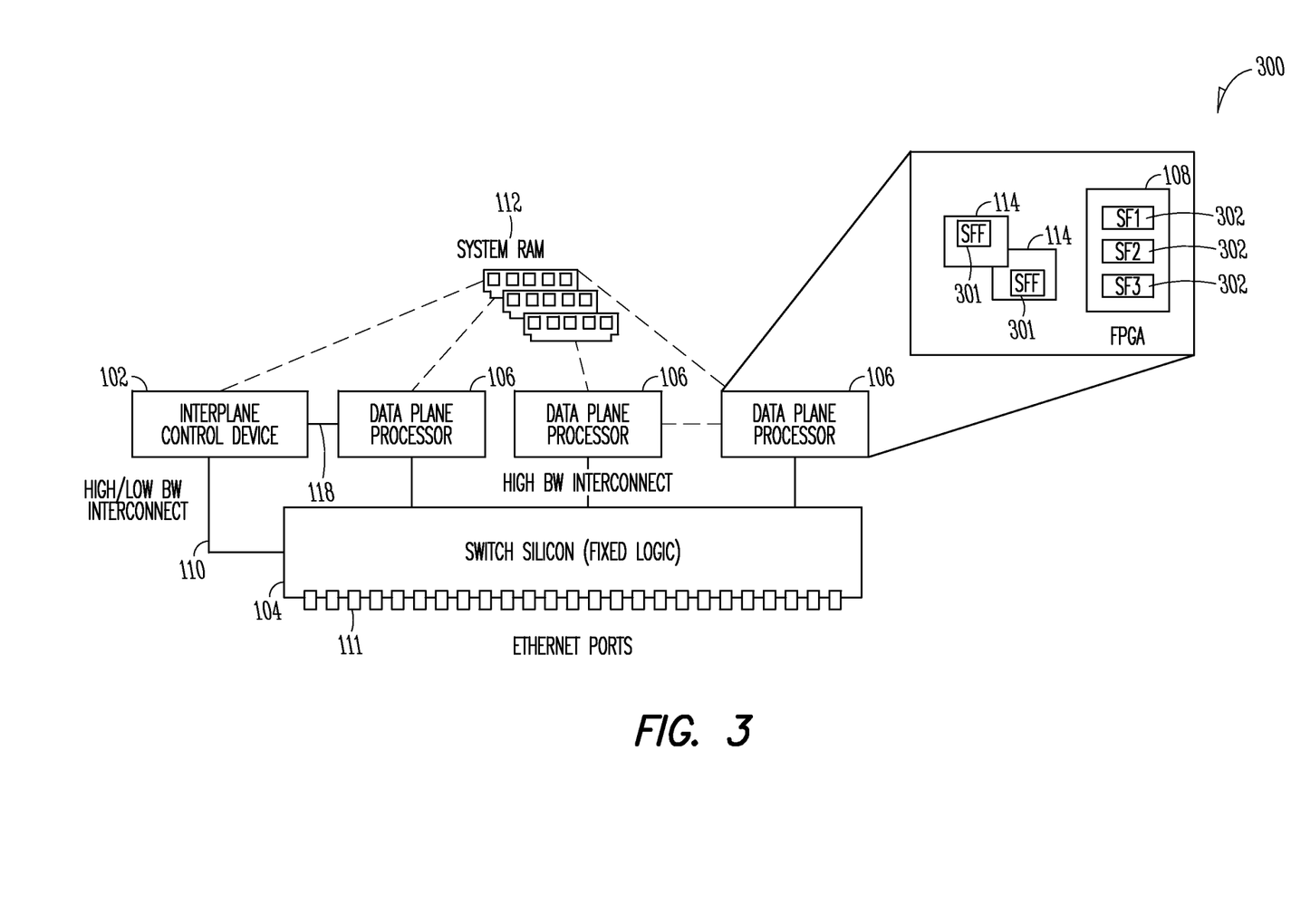
FIG. 3 illustrates a service function forwarder usage model of a switching platform in accordance with some embodiments.
Figure 4:
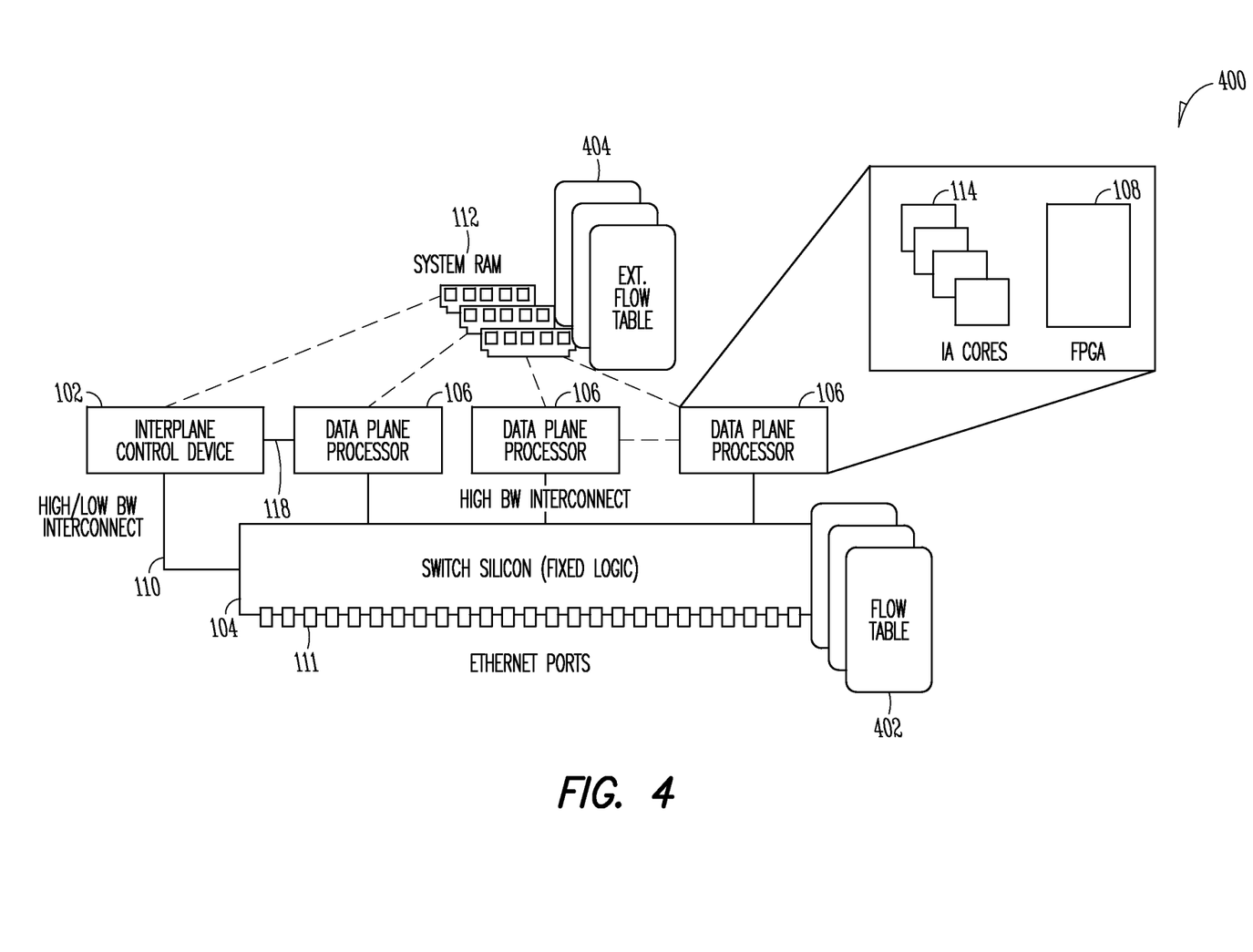
FIG. 4 illustrates an open virtual switch usage model of a switching platform in accordance with some embodiments.

The control device 102 initializes the hardware switch 104 and programs the switch ports of the hardware switch 104 facing the data plane processors 106, using flexible interfaces, to provide scalable flow processing that can be adapted for various usage models described later herein with reference to FIGS. 3-5, in addition to other data center usage models. The hardware switch 104 also receives packet streams and connects to other devices or systems using Ethernet ports 111. The control device 102 can execute (e.g., "run") on a specialized core in some embodiments. Alternatively, in other embodiments, the control device 102 (or processing circuitry of the control device 102) can be distributed among one or more Intel Architecture® (IA) cores 114, by way of nonlimiting example.

Figure 2:
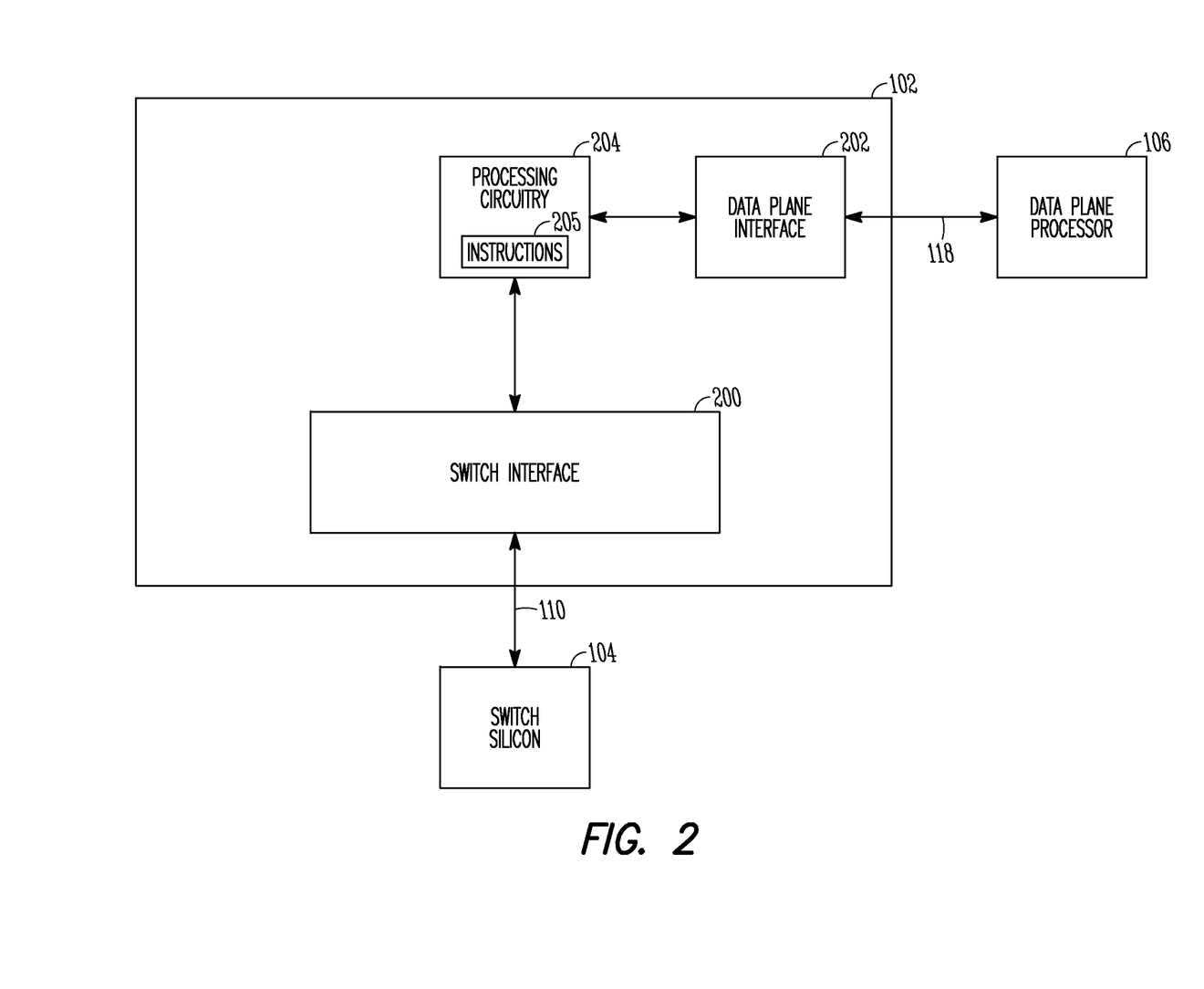
FIG. 2 illustrates a control device in accordance with some embodiments.

FIG. 2 illustrates an control device 102 in accordance with some embodiments. The control device 102 includes a switch interface 200 to communicate with one or more hardware switches (e.g., the hardware switch 104 (FIG. 1).

The control device 102 also includes a data plane interface 202 to communicate with one or more data plane processors 106 (FIG. 1).

The control device 102 includes processing circuitry 204 to perform functionalities as described later herein. It will be understood that any or all of the functions performed by processing circuitry 204 can be executed with hardware, software, firmware, or any combination thereof, on one or more processing cores, for example IA cores 114 or a core of the control device 102.

In embodiments, the processing circuitry 204 can detect characteristics of a plurality of packet streams that have been received at the switch interface 200. The processing circuitry 204 can distribute the plurality of packet streams between the one or more hardware switches (e.g., the hardware switch 104 (FIG. 1) and software data plane components based on the detected characteristics of the plurality of packet streams. Characteristics can include the complexity of a respective packet stream (measured in machine cycles), whether the packet stream is simply an I/O flow that does not use processing power, etc. Software data plane components can include elements for SDN or NFV functions as described earlier herein, and software data plane components can execute on IA cores 114.

The processing circuitry 204 can monitor packet streams and offload simple packet streams. The processing circuitry 204 can determine whether a packet stream is a simple packet stream based on processing power expected to be used by a respective packet stream (e.g., a packet stream is a simple packet stream if no or few central processing unit (CPU) machine cycles will be used to process a respective packet stream). The processing circuitry 204 can use any other criteria to determine which packet streams are simple packet streams, and the processing circuitry 204 may distribute other types of packet streams, other than simple packet streams, to hardware switches for further processing.

In embodiments, the processing circuitry 204 can distribute the plurality of packet streams such that at least one packet stream is designated to be processed by the one or more hardware switches. In embodiments, the processing circuitry 204 can detect capability information for the one or more hardware switches, and the processing circuitry 204 can distribute the plurality of packet streams based at least in part on capability information for the one or more hardware switches. Examples of capability information can include quality of service capabilities, whether the switch supports hardware accelerator capabilities to perform hardware-based lookup, support for encryption, etc.

The processing circuitry 204, as well as other components of the control device 102, can be implemented in a specialized core for control plane functionalities or, in some embodiments, some or all control plane functionalities can be distributed among a plurality of cores. Control plane functionalities are described in more detail below.

Control Plane Functionalities For Hardware Accelerated Software Packet Processing As briefly mentioned earlier herein, hardware switch fabric with TCAM has the advantage of high throughput and low latency. However, hardware switches may lack flexibility and configurability. Additionally, hardware switches may have only limited TCAM capacity. On the other hand, IA software, or other software including DPDK components, can exhibit high throughput and enhanced flexibility relative to hardware components, but with tradeoffs in latency and power. Embodiments therefore take advantage of both hardware and software data plane components to achieve enhanced performance and energy efficiency. Any or all of the control plane functionalities described herein can be implemented by components of the control device 102 (FIGS. 1 and 2). For example, the processing circuitry 204 (FIG. 2) can implement one or more functionalities, on a specialized processing core or on a plurality of IA cores 114, by way of nonlimiting example.

The control device 102 supports hardware/software hybrid packet processing in various embodiments by enabling the hardware switch 104 (FIG. 1) to process as many packet streams as can be processed according to hardware limitations or other limitations, while directing other packet streams to software for processing. In some embodiments, less frequently-accessed packet streams, or special packet streams, may be distributed to software, rather than hardware. For example, flows not requiring a particular quality of service, such as web-based traffic (as opposed to video or voice traffic which can have latency or quality of service requirements) may be routed to software instead of hardware switches. Accordingly, embodiments can allow data center operators to take advantage of hardware to accelerate the packet processing while still allowing for flexible software packet processing for packet streams that have relatively more complex processing demands.

The control device 102 monitors network traffic, decides which packet streams should be processed by switch hardware, and uses a flexible interface to dynamically configure the multiple data planes to achieve enhanced performance. The control device 102 can implement a variety of algorithms to decide which packet streams should be cached in TCAM.

The control device 102 can perform hardware-assisted load balancing. For example, processing circuitry 204 (FIG. 2) of the control device 102 can detect traffic load characteristics or data corresponding to the plurality of packet streams, and direct one or more packet streams to the one or more hardware switches based on traffic load characteristics. In examples, the traffic load can be detected based on traffic patterns observed at Ethernet ports 111 of the hardware switch 104 (FIG. 1).

In embodiments, the control device 102 provides hardware packet processing hints to hardware switch 104 (FIG. 1) so that the hardware switch 104 can direct packets of the packet stream to an appropriate target core. The target core can include a processor, software application, or other module that will process the packet stream. The control device 102 may provide these hints based on context awareness in some embodiments, or on any other criteria or user-defined request.

The control device 102 may provide enhanced performance or energy efficiency by determining, based on network load or other criteria, how many processing cores (e.g., IA cores 114, FIG. 1) must remain active to keep up with demanded packet processing speed. Instead of statically binding ports to core, the control device 102 may then provide hints to the hardware switch 104 to direct packet streams to those active cores, while keeping other cores in an inactive, or power-saving state.

Usage Models

The control device 102 described above can be used in a variety of systems or networks in accordance with various usage models. FIG. 3 illustrates a service function forwarder usage model of a switching platform 300 in accordance with some embodiments. The control device 102 can program the hardware switch 104 with a routing rule. For example, the control device 102 can program the hardware switch 104 with a rule (using the interconnect 110) to steer traffic targeted for a Service Function Forwarder (SFF) 301 instance executing (e.g., "running") on one of more data plane processors 106. In various embodiments, the SFF 301 can use an available interface to pass the packets to the Service Functions (SF) 302. SF 302 can execute within FPGA 108, although embodiments are not limited thereto. An SF is a function that is responsible for specific treatment of received packets. An SF can act at the network layer or other open systems interconnection (OSI) layers. An SF can be a virtual instance of a function or an SF can be embedded in a physical network element. One of multiple SFs can be embedded in the same network element. Multiple instances of the SF can be enabled in the same administrative domain. SFs can include, by way of nonlimiting example, firewalls, wireless area network (WAN) and application acceleration, Deep Packet Inspection (DPI), server load balancers, transport control protocol (TCP) optimizers, etc.

Other usage models are also available in some embodiments. For example, FIG. 4 illustrates an open virtual switch usage model of a switching platform 400 in accordance with some embodiments. In at least this embodiment, the hardware switch 104 is abstracted as an Open Virtual Switch (OVS) data plane. The hardware switch 104 includes flow tables 402 that include rules for routing packet streams. Because only a limited number of flows can be supported in the hardware switch 104 due to space limitations and hardware limitations, the flow tables 402 can cooperate with extended flow tables 404 stored in, for example, system RAM 112. The extended flow tables 404 can provide for greater scalability than can be achieved with hardware-only switching. When used with DPDK packet processing, high-speed software switching (e.g., CuckooSwitching), and application programming interfaces (APIs) for dynamic configuration, data center operators can extend the packet processing pipeline beyond the hardcoded pipeline in the hardware switch 104 while still maintaining high performance as is typically a feature of hardware switching. Additionally, the switching platform 400 allows flows with some of the stateful actions beyond those that can be performed with some available fixed-logic hardware switches.

Figure 5:
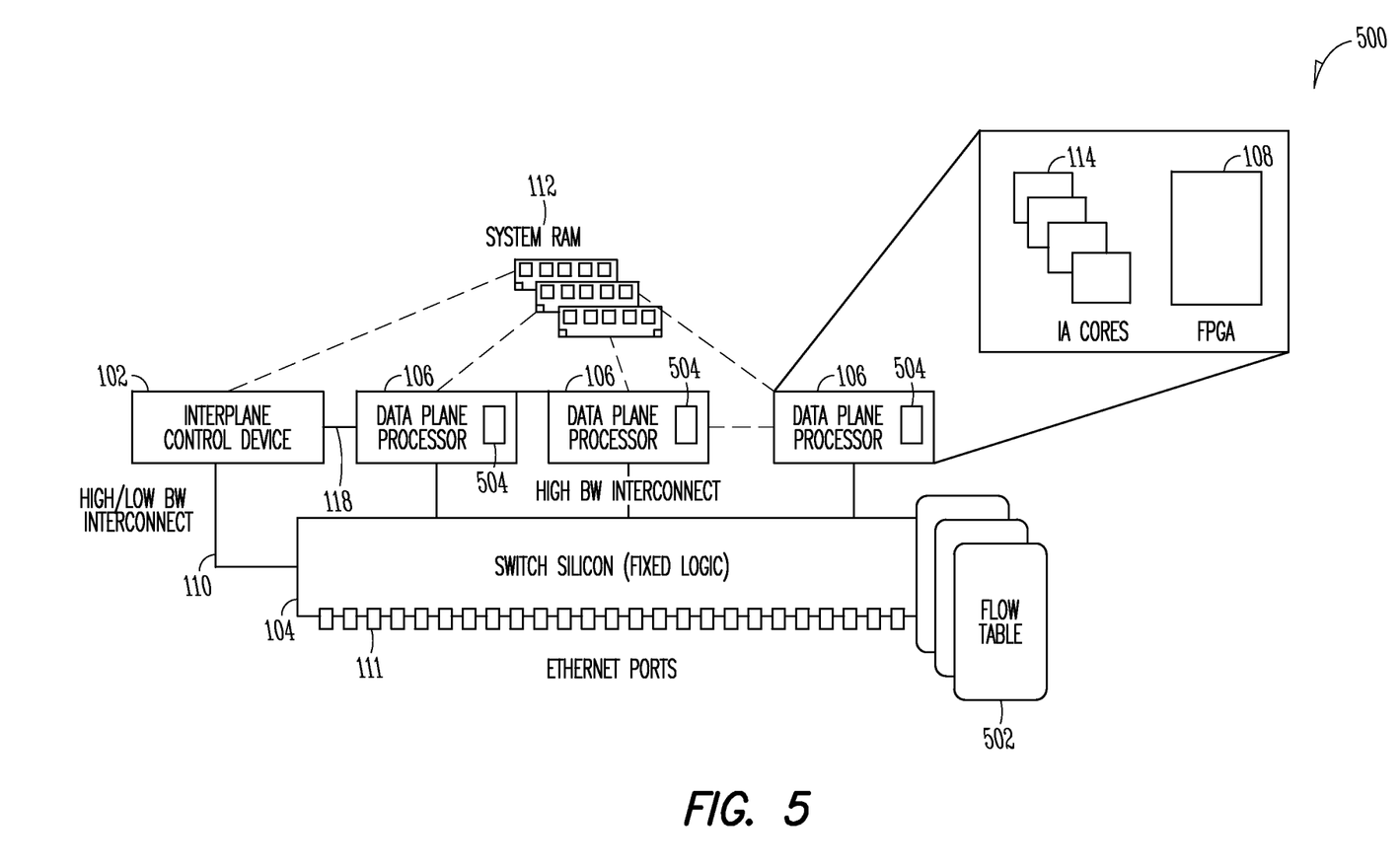
FIG. 5 illustrates a connection tracker usage model of a switching platform in accordance with some embodiments.

FIG. 5 illustrates a connection tracker usage model of a switching platform 500 in accordance with some embodiments. In at least these embodiments, in addition to optionally providing flow tables 502 at the hardware switch 104, an application delivery controller (ADC) instance 504 can execute on one or more of the data plane processors 106. Rules included in the flow tables 502 can route application traffic among various ports facing the data plane processors 106. The flow tables 502 can be the same as, or similar to, the flow tables 402 (FIG. 4).

The ADC instance 504 executing on each data plane processor 106 can provide a stateful connection tracker for monitoring connections. The connection tracker tracks individual or, in some cases, aggregate flow characteristics. For example the connection tracker can track the number of packets sent or received per second, the number of bytes sent or received, the types of packets being transmitted by the flow, etc. Two examples of types of packets include TCP-SYN packets, which open connections, and TCP-FIN packets, which close existing connections. The connection tracker can track this information or other information for security purposes to prevent against attack, to provide better quality of service for certain flows that are more active than other flows, etc.

Example Methods

Figure 6:
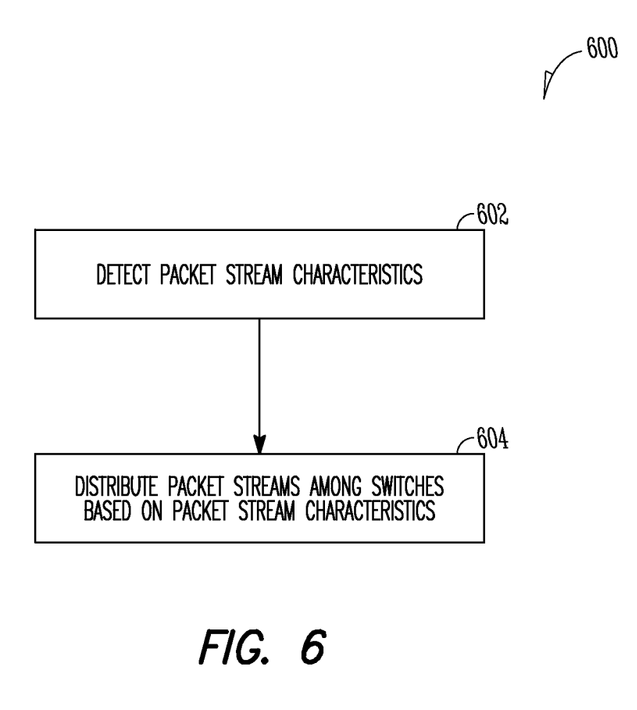
FIG. 6 is a flow diagram of an example hardware-implemented method in accordance with some embodiments.

Various methods can be implemented in accordance with various embodiments to perform functions of usage models described above, as well as other usage models. FIG. 6 is a flow diagram of an example method 600 in accordance with some embodiments. A control device, for example the control device 102, as described above with respect to FIG. 1 or elements thereof described with reference to FIG. 2, can perform operations of the example method 600. Accordingly, the example method 600 will be described with reference to components of FIG. 2. For example, processing circuitry 204 can perform one or more operations of example method 600.

The example method 600 begins with operation 602 with the processing circuitry 204 detecting characteristics of a plurality of packet streams received at a switch interface 200. In embodiments, the packet streams may ultimately have been received at Ethernet ports 111 of the hardware switch 104, The example method 600 continues with operation 602 with the processing circuitry 204 distributing the plurality of packet streams between one or more hardware switches (e.g., hardware switch 104) and one or more data plane components based on detected characteristics of the plurality of packet streams.

In embodiments, the example method 600 can include the control device 102 providing a hint field to a respective one of the one or more hardware switches (e.g., hardware switch 104) that includes information regarding an action to be taken by the respective one of the one or more hardware switches in response to receiving the data packet. In embodiments, the example method 600 can include detecting capability information for the one or more hardware switches and distributing the plurality of packet streams based at least in part on capability information for the one or more hardware switches.

The example method 600 can include additional operations such as, for example, detecting traffic load characteristics corresponding to the plurality of packet streams and directing one or more packet streams to the one or more hardware switches based on traffic load characteristics.

Traffic load characteristics can be detected based on observed data at Ethernet ports of the hardware switch 104 (FIG. 1)

The example method 600 can include detecting that a packet processing workload has fallen below a threshold value based on the detected traffic load characteristics and instructing at least one processing core to enter a sleep mode responsive to the detecting.

The example method 600 can include any other operations or functionalities of an control device 102 or usage model thereof, described above with respect to FIGS. 1-5. Operations can be performed in any order or in parallel where appropriate. The method 600 can be performed by hardware, firmware, software, or any combination thereof Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more processors of the control device 102 may be configured by firmware or software (e.g., instructions 205 (FIG. 2), an application portion, or an application) as a module that operates to perform specified operations. In an example, the software may reside on at least one machine-readable medium. In an example, the software, when executed by the underlying hardware of the module (e.g., the control device 102), can include instructions 205 (FIG. 2) to cause the hardware to perform the specified operations.

For example, instructions 205 can cause hardware to detect characteristics of a plurality of packet streams received at a switch interface or at Ethernet ports of fixed logic hardware switches. The characteristics can include whether a respective packet stream of the plurality of packet streams is a simple packet stream, based on a number of central processing unit (CPU) machine cycles are expected to be used by the respective packet stream. The instructions 205 can cause the hardware to distribute the plurality of packet streams between a hardware switch and software data plane components based on detected characteristics of the plurality of packet streams, such that simple packet streams of the plurality of packet streams are distributed to the hardware switch.

In various embodiments, the instructions 205 can optionally cause the hardware to detect traffic load characteristics corresponding to the plurality of packet streams and to direct one or more packet streams to the one or more hardware switches based on traffic load characteristics. As described earlier herein, traffic load characteristics can be detected by observing data and traffic patterns at the Ethernet ports 111 of hardware switch 104 (FIG. 1) The instructions 205 can cause the hardware to detect that a packet processing workload has fallen below a threshold value based on the detected traffic load characteristics, and to instructing at least one processing core (e.g., IA cores 114) to enter a sleep mode responsive to the detecting.

In some embodiments, the instructions 205 can cause the hardware to distribute at least one packet stream to the at least one hardware switch (e.g., hardware switch 104) based on a rule stored in a TCAM corresponding to the at least one hardware switch. In embodiments, the hardware may store the rule in the TCAM based on an algorithm for storing rules in TCAM according to the detected traffic load characteristics.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions 205 for execution by a machine (e.g., the control device 102 or any other module) and that cause the machine to perform any one or more of the techniques of the present disclosure, or that is capable of storing, encoding or carrying data structures used by or associated with such instructions. In other words, the processing circuitry 204 (FIG. 2) can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 205 may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Figure 7:
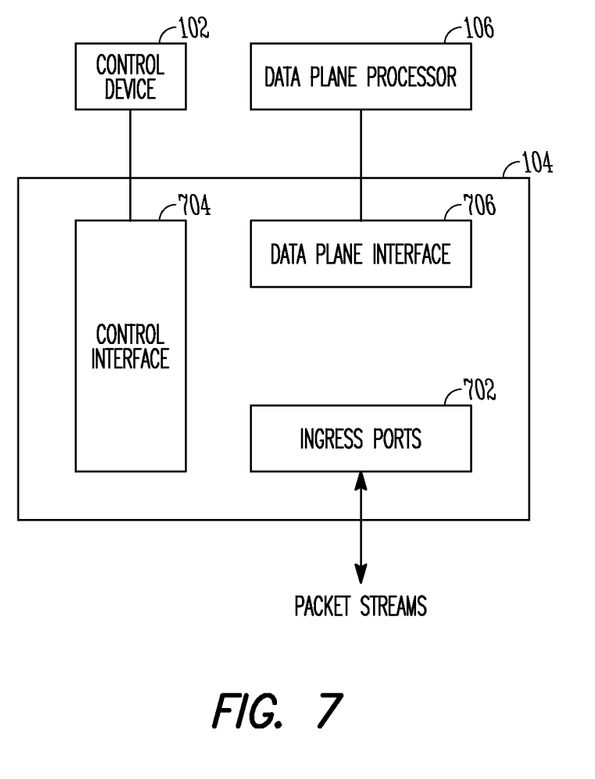
FIG. 7 is a block diagram of a hardware switch in accordance with some embodiments.

FIG. 7 is a block diagram of a hardware switch 104 in accordance with some embodiments. The hardware switch 104 includes ingress ports 702 for receiving a plurality of packet streams. The ingress ports 702 can also be referred to as Ethernet ports, communication ports, etc.

The hardware switch 104 includes a control interface 704 to communicate with a control device 102 and a switch data plane interface 706 to communicate with one or more data plane processors 106.

The hardware switch 104 is configured to receive, over the control interface 704, indications of which packet streams, of the plurality of packet streams, are designated to be processed by the hardware switch 104 according to embodiments described above. As described earlier herein, the hardware switch 104 can provide capability information, over the control interface 704, to the control device 102, and the hardware switch 104 can receive a hardware hint to instruct the hardware switch 104 to direct packets to a target processing core for processing a corresponding packet stream.

ADDITIONAL NOTES & EXAMPLES

Example 1 includes subject matter (such as a control device, interplane control device, control plane processor, computer device and or any other electrical apparatus, device or processor) including a switch interface to communicate with one or more hardware switches; a data plane interface to communicate with one or more data plane processors; and processing circuitry to detect characteristics of a plurality of packet streams received at the switch interface and distribute the plurality of packet streams between the one or more hardware switches and software data plane components of the one or more data plane data plane processors based on the detected characteristics of the plurality of packet streams, such that at least one packet stream of the plurality of packet streams is designated to be processed by the one or more hardware switches.

In Example 2, the subject matter of Example 1 can optionally include wherein the processing circuitry is further configured to detect capability information for the one or more hardware switches, and wherein the processing circuitry distributes the plurality of packet streams based at least in part on the capability information for the one or more hardware switches.

In Example 3, the subject matter of any of Examples 1-2 can optionally include wherein the processing circuitry is configured to direct simple packet streams to the one or more hardware switches, and wherein the processing circuitry determines whether a respective packet stream of the plurality of packet streams is a simple packet stream based on a number of central processing unit (CPU) machine cycles expected to be used by the respective packet stream.

In Example 4, the subject matter of any of Examples 1-3 can optionally include wherein the processing circuitry is configured to detect traffic load data corresponding to the plurality of packet streams, and to direct one or more packet streams to the one or more hardware switches based on the traffic load data.

In Example 5, the subject matter of Example 4 can optionally include wherein the processing circuitry is further configured to detect that a packet processing workload has fallen below a threshold value; and provide a command to at least one processing core to cause the at least one processing core to enter a sleep mode responsive to the detecting.

In Example 6, the subject matter of any of Examples 1-5 can optionally include wherein the processing circuitry is configured to program at least one hardware switch to execute a routing rule.

In Example 7, the subject matter of Example 6 can optionally include wherein the routing rule includes a rule to direct packets of a packet stream to a Service Function (SF) executing on a field programmable gate array (FPGA).

In Example 8, the subject matter of any of Examples 1-7 can optionally include wherein the processing circuitry is further configured to program a hardware hint to instruct at least one hardware switch to direct packets to a target processing core for processing a corresponding packet stream.

In Example 9, the subject matter of any of Examples 1-8 can optionally include wherein the processing circuitry executes on a processing core specific to the control device.

In Example 10, the subject matter of any of Examples 1-9 can optionally include wherein the processing circuitry is distributed between two or more processing cores.

Example 11 includes subject matter such as a machine-readable medium including instructions that, when executed on a machine (such as a control device, interplane control device, control plane processor, computing device, NIC card, etc.) cause the machine to detect characteristics of a plurality of packet streams received at a switch interface, wherein the characteristics include whether a respective packet stream of the plurality of packet streams is a simple packet stream, based on a number of central processing unit (CPU) cycles expected to be used by the respective packet stream; and distribute the plurality of packet streams between a hardware switch and software data plane components based on the detected characteristics of the plurality of packet streams, such that simple packet streams of the plurality of packet streams are distributed to the hardware switch.

In Example 12, the subject matter of Example 11 may optionally include further instructions to cause the machine to detect traffic load data on a network corresponding to the plurality of packet streams; and direct one or more packet streams to the one or more hardware switches based on traffic load characteristics.

In Example 13, the subject matter of any of Examples 11-12 may optionally include further instructions to cause the machine to detect that a packet processing workload has fallen below a threshold value based on the detected traffic load characteristics; and instruct at least one processing core to enter a sleep mode responsive to the detecting.

In Example 14, the subject matter of any of Examples 11-13 may optionally include instructions to cause the machine to distribute at least one packet stream to at least one hardware switch based on a rule stored in a Ternary Content-Addressable Memory (TCAM) corresponding to the at least one hardware switch.

In Example 15, the subject matter of Example 14 may optionally include wherein the rule is stored in the TCAM based on an algorithm for storing rules in the TCAM according to the detected traffic load characteristics.

Example 16 include a mechanism (e.g., a hardware switch, fixed-logic silicon switch, etc.) comprising ingress ports for receiving a plurality of packet streams; a control interface to communicate with a control device; and a data plane interface to communicate with one or more data plane processors, wherein the hardware switch is configured to receive, over the control interface, indications of which packet streams, of the plurality of packet streams, are designated to be processed by the hardware switch.

Example 17 includes the subject matter of Example 16, and optionally wherein the hardware switch is further configured to provide capability information, over the control interface, to the control device.

Example 18 includes the subject matter of any of Examples 16-17, and optionally wherein the hardware switch is further configured to receive a hardware hint to instruct the hardware switch to direct packets to a target processing core for processing a corresponding packet stream.

Example 19 includes subject matter include a method, the method comprising detecting characteristics of a plurality of packet streams received at a switch interface; and distributing the plurality of packet streams between one or more hardware switches and one or more software data plane components based on detected characteristics of the plurality of packet streams.

In Example 20, the subject matter of Example 19 can optionally include providing a hint field to a respective one of the one or more hardware switches that includes information regarding an action to be taken by the respective one of the one or more hardware switches in response to receiving a data packet.

In Example 21, the subject matter of any of Examples 19-20 can optionally include detecting capability information for the one or more hardware switches; and distributing the plurality of packet streams based at least in part on capability information for the one or more hardware switches.

In Example 22, the subject matter of any of Examples 19-21 can optionally include detecting which of the plurality of packet streams are simple packet streams based on a number of central processing unit (CPU) cycles expected to be used by a respective packet stream, to generate a set of simple packet streams; and distributing the set of simple packet streams among the one or more hardware switches.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A control device comprising:
    a switch interface to communicate with one or more hardware switches;
    a data plane interface to communicate with one or more data plane processors; and
    processing circuitry configured to:
    detect characteristics of a plurality of packet streams received at the switch interface, and
    distribute the plurality of packet streams between the one or more hardware switches and software data plane components of the one or more data plane data plane processors based on the detected characteristics of the plurality of packet streams, such that at least one packet stream of the plurality of packet streams is designated to be processed by the one or more hardware switches.

2. The controldevice of claim 1, wherein the processing circuitry is further configured to:
    detect capability information for the one or more hardware switches, and wherein the processing circuitry distributes the plurality of packet streams based at least in part on the capability information for the one or more hardware switches.

3. The control device of claim 2, wherein the processing circuitry is configured to direct simple packet streams to the one or more hardware switches, and wherein the processing circuitry determines whether a respective packet stream of the plurality of packet streams is a simple packet stream based on a number of central processing unit (CPU) machine cycles expected to be used by the respective packet stream.

4. The control device of claim 3, wherein the processing circuitry is configured to detect traffic load data corresponding to the plurality of packet streams, and to direct one or more packet streams to the one or more hardware switches based on the traffic load data.

5. The control device of claim 4, wherein the processing circuitry is further configured to:
detect that a packet processing workload has fallen below a threshold value; and
provide a command to at least one processing core to cause the at least one processing core to enter a sleep mode responsive to the detecting.

6. The control device of claim 2, wherein the processing circuitry is configured to program at least one hardware switch to execute a routing rule.

7. The control device of claim 6, wherein the routing rule includes a rule to direct packets of a packet stream to a Service Function (SF) executing on a field programmable gate array (FPGA).

8. The control device of claim 1, wherein the processing circuitry is further configured to program a hardware hint to instruct at least one hardware switch to direct packets to a target processing core for processing a corresponding packet stream.

9. The control device of claim 8, wherein the processing circuitry executes on a processing core specific to the control device.

10. The control device of claim 8, wherein the processing circuitry is distributed between two or more processing cores.

11. A non-transitory machine-readable medium including instructions that, when executed on a machine cause the machine to perform operations including:
detecting characteristics of a plurality of packet streams received at a switch interface, wherein the characteristics include whether a respective packet stream of the plurality of packet streams is a simple packet stream, based on a number of central processing unit (CPU) cycles expected to be used by the respective packet stream; and
distributing the plurality of packet streams between a hardware switch and software data plane components based on the detected characteristics of the plurality of packet streams, such that simple packet streams of the plurality of packet streams are distributed to the hardware switch.

12. The non-transitory machine-readable medium of claim 11, including instructions that, when executed on the machine, cause the machine to perform operations including:
detecting traffic load data on a network corresponding to the plurality of packet streams; and
directing one or more packet streams to one or more hardware switches based on traffic load characteristics.

13. The non-transitory machine-readable medium of claim 12, including instructions that, when executed on the machine, cause the machine to perform operations including:
detecting that a packet processing workload has fallen below a threshold value based on the detected traffic load characteristics; and
instructing at least one processing core to enter a sleep mode responsive to the detecting.

14. The non-transitory machine-readable medium of claim 12 including instructions that, when executed on the machine, cause the machine to perform operations including:
distributing at least one packet stream to at least one hardware switch based on a rule stored in a Ternary Content-Addressable Memory (TCAM) corresponding to the at least one hardware switch.

15. The non-transitory machine-readable medium of claim 14, wherein the rule is stored in the TCAM based on an algorithm for storing rules in the TCAM according to the detected traffic load characteristics.

16. A hardware switch comprising:
ingress ports for receiving a plurality of packet streams;
a control interface to communicate with a control device; and
a data plane interface to communicate with one or more data plane processors, wherein the hardware switch is configured to receive, over the control interface, indications of which packet streams, of the plurality of packet streams, are designated to be processed by the hardware switch, wherein the packet streams that are designated to be processed by the hardware switch share at least one common characteristic.

17. The hardware switch of claim 16, wherein the hardware switch is further configured to provide capability information, over the control interface, to the control device.

18. The hardware switch of claim 16, wherein the hardware switch is further configured to receive a hardware hint to instruct the hardware switch to direct packets to a target processing core for processing a corresponding packet stream.

19. A method for packet processing, the method comprising:
detecting characteristics of a plurality of packet streams received at a switch interface; and
distributing the plurality of packet streams between one or more hardware switches and one or more software data plane components based on the detected characteristics of the plurality of packet streams, such that at least one packet stream of the plurality of packet streams is designated to be processed by the one or more hardware switches.

20. The method of claim 19, further comprising:
providing a hint field to a respective one of the one or more hardware switches, the hint field including information regarding an action to be taken by the respective one of the one or more hardware switches in response to receiving a data packet.

21. The method of claim 19, further comprising:
detecting capability information for the one or more hardware switches; and
distributing the plurality of packet streams based at least in part on the detected capability information for the one or more hardware switches.

22. The method of claim 21, further comprising:
detecting which of the plurality of packet streams are simple packet streams based on a number of central processing unit (CPU) cycles expected to be used by a respective packet stream, to generate a set of simple packet streams; and
distributing the set of simple packet streams among the one or more hardware switches.

* * * * *

UNITED STATES PATENT AND TRADEMARK OFFICE
CERTIFICATE OF CORRECTION

PATENT NO. : 9,847,936 B2  
APPLICATION NO. : 14/750085  
DATED : December 19, 2017  
INVENTOR(S) : Jani et al.

Page 1 of 1

It is certified that error appears in the above-identified patent and that said Letters Patent is hereby corrected as shown below:

On the Title Page

In item (71), in "Applicants", in Column 1, Lines 1-11, delete "Applicants: Nrupal Jani, Hillsboro, OR (US); Dinesh Kumar, Beaverton, OR (US); Christian Maciocco, Portland, OR (US); Ren Wang, Portland, OR (US); Neerav Parikh, Hillsboro, OR (US); John Fastabend, Hillsboro, OR (US); Iosif Gasparakis, Hilsboro, OR (US); David J. Harriman, Portland, OR (US); Patrick L. Connor, Beaverton, OR (US); Sanjeev Jain, Chandler, AZ (US)" and insert --Intel Corporation, Santa Clara, CA (US)-- therefor In item (72), in "Inventors", in Column 1, Line 7, delete "Hilsboro," and insert --Hillsboro,-- therefor In the Claims In Column 12, Line 57, in Claim 2, delete "controldevice" and insert --control device-- therefor Signed and Sealed this  
Fourth Day of June, 2019

Andrei Iancu  
*Director of the United States Patent and Trademark Office*